(12) United States Patent
Ho et al.

(10) Patent No.: US 10,042,116 B2
(45) Date of Patent: Aug. 7, 2018

(54) TECHNIQUES FOR DIRECT OPTICAL COUPLING OF PHOTODETECTORS TO OPTICAL DEMULTIPLEXER OUTPUTS AND AN OPTICAL TRANSCEIVER USING THE SAME

(71) Applicant: Applied Optoelectronics, Inc., Sugar Land, TX (US)

(72) Inventors: I-Lung Ho, Sugar Land, TX (US); Zhengyu Miao, Sugar Land, TX (US); Qin Li, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/137,823

(22) Filed: Apr. 25, 2016

(65) Prior Publication Data

US 2017/0307819 A1  Oct. 26, 2017

(51) Int. Cl.
*H04J 14/02* (2006.01)
*G02B 6/12* (2006.01)
*G02B 6/42* (2006.01)

(52) U.S. Cl.
CPC ...... *G02B 6/12016* (2013.01); *G02B 6/12011* (2013.01); *G02B 6/12019* (2013.01); *G02B 6/4246* (2013.01); *G02B 6/4292* (2013.01); *H04J 14/02* (2013.01)

(58) Field of Classification Search
CPC .... H04J 14/02; H04J 14/0282; H04J 14/0221; H04J 14/0202; H04B 10/40; H04B 10/506; H04B 10/503; H04B 10/504; G02B 6/4246; G02B 6/4293; G02B 6/4249

USPC ........... 398/135, 136, 137, 138, 139, 79, 82, 398/158.159, 85, 87, 84, 202, 208, 213, 398/214; 385/24, 37, 14, 43
See application file for complete search history.

(56) References Cited

U.S. PATENT DOCUMENTS

| | | | |
|---|---|---|---|
| 5,617,234 A | 4/1997 | Koga et al. | |
| 7,058,263 B2 * | 6/2006 | Welch .................... | B82Y 20/00 385/24 |
| 7,162,124 B1 | 1/2007 | Gunn, III et al. | |

(Continued)

OTHER PUBLICATIONS

U.S. Office Action dated Apr. 13, 2018, received in U.S. Appl. No. 15/432,242, 28 pgs.

(Continued)

*Primary Examiner* — Hanh Phan
(74) *Attorney, Agent, or Firm* — Grossman Tucker Perreault & Pfleger, PLLC; Norman S. Kinsella

(57) ABSTRACT

An arrayed waveguide grating (AWG) device for use in an optical transceiver is disclosed, and can de-multiplex an optical signal into N number of channel wavelengths. The AWG device can include an AWG chip, with the AWG chip providing a planar lightwave (PLC) circuit configured to de-multiplex channel wavelengths and launch the same into output waveguides. A region of the AWG chip may be tapered such that light traveling via the output waveguides encounters an angled surface of the tapered region and reflects towards an output interface region of the AWG chip. Thus detector devices may optically couple to the output interface region of the AWG chip directly, and can avoid losses introduced by other approaches which couple an output of an AWG to detectors by way of a fiber array or other intermediate device.

19 Claims, 7 Drawing Sheets

(56) References Cited

U.S. PATENT DOCUMENTS

| | | | |
|---|---|---|---|
| 7,376,308 B2 | 5/2008 | Cheben et al. | |
| 7,532,783 B2 * | 5/2009 | Bai | G02B 6/12019 385/14 |
| 7,941,053 B2 * | 5/2011 | Dallesasse | H04B 10/40 398/135 |
| 8,831,433 B2 | 9/2014 | Ho et al. | |
| 9,341,786 B1 | 5/2016 | Gamache et al. | |
| 2003/0174964 A1 | 9/2003 | Gao et al. | |
| 2004/0161186 A1 | 8/2004 | Crafts et al. | |
| 2015/0249501 A1 * | 9/2015 | Nagarajan | H04B 10/40 398/79 |
| 2016/0149662 A1 | 5/2016 | Soldano et al. | |
| 2016/0349451 A1 | 12/2016 | Shen et al. | |
| 2017/0168252 A1 | 6/2017 | Pezeshki et al. | |

OTHER PUBLICATIONS

PCT Search Report and Written Opinion dated Jul. 6, 2017, received in corresponding PCT Application No. PCT/US17/29350, 9 pgs.
U.S. Office Action dated Aug. 29, 2017, received in U.S. Appl. No. 15/432,242, 15 pgs.

* cited by examiner

US 10,042,116 B2

TECHNIQUES FOR DIRECT OPTICAL COUPLING OF PHOTODETECTORS TO OPTICAL DEMULTIPLEXER OUTPUTS AND AN OPTICAL TRANSCEIVER USING THE SAME

TECHNICAL FIELD

The present disclosure relates to optical transceiver modules, and more particularly, to direct optical coupling of photodetectors to optical demultiplexer outputs to reduce fiber use and insertion loss.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield. Optical transceivers can include one or more transmitter optical subassemblies (TOSAs) and receiver optical subassemblies (ROSAs) for the purpose of transmitting and receiving optical signals. As channel density becomes an increasingly important aspect of optical transceivers, the ability scale-down while maintaining nominal transceiver performance raises numerous non-trivial challenges.

BRIEF DESCRIPTION OF THE DRAWINGS

These and other features and advantages will be better understood by reading the following detailed description, taken together with the drawings wherein.

Figure 1:
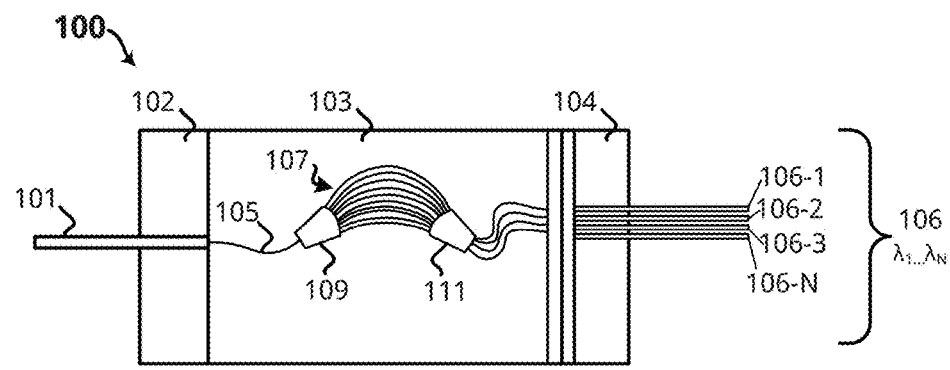
FIG. 1 is a schematic diagram of an example arrayed waveguide grating (AWG) device.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

As discussed above, optical transceivers can include receiver optical subassemblies (ROSAs) that are configured to receive multiple channel wavelengths via a common fiber and de-multiplex the same for detection, amplification and conversion purposes. Some approaches to ROSAs include the use of an arrayed waveguide grating (AWG), which operate based on some underlying principles of optics that recognize light waves of different wavelengths interfere linearly with each other. This fundamental principle manifests itself in WDM signaling, which allows a plurality of channel wavelengths to be carried by a single optical fiber with negligible crosstalk between channels. AWGs can both multiplex and de-multiplex a WDM signal.

A schematic of one example AWG device 100 configured to multiplex/de-multiplex WDM signals is shown in FIG. 1. The AWG device 100 may be a silica-based AWG device fabricated using planar lightwave circuit (PLC) techniques, which are similar to semiconductor processes used to produce ICs and can include depositing doped and un-doped layers of silica on a substrate, such as silicon. The AWG device 100 includes an input coupling region 102 to couple to the fiber 101, an AWG chip region 103 or circuit for de-multiplexing channel wavelengths, and an output coupling region 104 for coupling to a fiber array 106, with each fiber 106-1 to 106-4 being configured to receive different channel wavelengths. The AWG chip region 103 includes of an array of waveguides 107 (also called a phased array) and two couplers 109 and 111. An input waveguide, e.g., waveguide 105, carries an optical signal consisting of multiple wavelengths $\lambda_1$-$\lambda_n$ into the first input coupler 109, which then distributes the light amongst an array of waveguides. The light subsequently propagates through the array of waveguides 107 to the second output coupler 111. The length of each of the waveguides 107 is chosen so that the optical path length difference between adjacent waveguides (dL) equals an integer multiple of the central wavelength $\lambda_c$ of the demultiplexer. Linearly increasing length of the array waveguides 107 will cause interference and diffraction when light mixes in the output coupler 111. As a result, each wavelength is focused into only one of the N output waveguides 106-1 to 106-N, which may also be called output channels.

Figure 2:
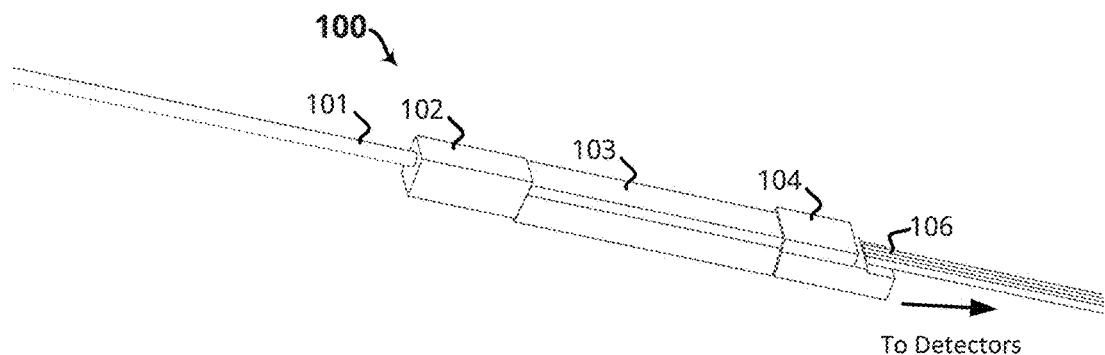
FIG. 2 is a perspective view of the AWG device of FIG. 1 with an output coupled to a fiber array.

The particular configuration illustrated in FIG. 1 is a 1×4 PLC demultiplexer (or demux), but other channel configurations, e.g., 1×8, 1×16, 2×8, 2×16, etc., should be apparent in light of this disclosure. PLC-type demuxes can provide relatively low insertion loss, low polarization dependent loss (PDL) and function within a range of operating temperatures. FIG. 2 shows one example packaging of the AWG device 100. As shown, the AWG device 100 includes the output coupling region 104 coupled to the fiber array 106, with the fiber array 106 being coupled to detector devices such as photodiodes (not shown).

In use, a multiplexed optical signal (e.g., a WDM) may be received via the input fiber 101 and split into separate channel wavelengths via, for example, waveguides 107 of the AWG circuit 103. The AWG device 100 may then launch the separated channel wavelengths into respective fibers 106-1 to 106-N of the fiber array 106. The AWG device 100 can introduce an insertion loss of about 3 to 7 db based on, for example, the optical coupling between the optical fiber 101 and the input coupling region 102, and by virtue of the AWG circuit 103 itself. At an output end, additional loss can be introduced based on the optical coupling between the output coupling region 104 and the fiber array 106. While the fiber array 106 can include a 45 degree cut to reduce back-reflection and insertion loss, the overall insertion loss introduced can be about 0.5 to 1.0 db, if not greater. Likewise, the optical coupling between the fiber array 106 and detector devices (not shown) can further introduce insertion loss of about 0.5 to 1.0 db. Thus the overall insertion loss introduced by use of the fiber array 106 can total about 1.0 to 2.0 db, which can significantly reduce sensitivity of the ROSA device and consequently reduce overall transceiver performance.

Thus, in accordance with an embodiment, a direct-coupling AWG device is disclosed that provides direct coupling between output channels of the AWG device and detector devices without the necessity of an intermediate fiber or other physical device. The direct-coupling AWG device may be used in combination with detectors and associated circuitry and can comprise a receiver optical subassembly (ROSA) for use in an optical transceiver device, or other optical device that seeks to de-multiplex optical WDM signals.

In more detail, the direct-coupling AWG device may be formed using, for example, PLC techniques or other suitable formation processes. In an embodiment, the AWG device is formed on a substrate such as a silicon wafer or any other suitable substrate, and may include depositing sequential layers of cladding and core material thereon. In an embodiment, the cladding layer may comprise silicon (Si) and the core material may comprise silicon dioxide ($SiO_2$), also known as Silica. However, other cladding and core materials may be used and are also within the scope of this disclosure. The formed AWG device may then form essentially a monolithic structure and provide a PLC configured to de-multiplex a WDM signal into multiple different channel wavelengths for output to associated detectors. The formed AWG device can include a plurality of sidewalls that extend longitudinally from a first end to a second end, with the plurality of sidewalls being formed at least in part by the cladding material. The first end of the AWG device may be configured to optically couple with an input fiber, and a portion proximal to the second end of the AWG device may be configured to optically couple with a plurality of detector devices. Thus, and for the purpose of reference, the first end may be generally understood to be an input coupling end and the second end may be generally understood as providing an output coupling region.

The input coupling end of the AWG device may be coupled to, for example, an LC connector receptacle or other suitable connector receptacle. The connector receptacle may be coupled to the AWG device by, for example, an adhesive or other suitable approach. The input end may be configured with a surface that is angled at about 8 degrees for the purposes of reducing back reflection of an optical signal launched into the AWG device by an associated input fiber.

The output coupling region of the AWG device can include output waveguides or output channels comprising core materials that are configured to substantially confine light, e.g., at least 80 percent of incident light, along a first light path that extends longitudinally towards a substantially reflective surface. The substantially reflective surface may be provided by a portion of the output coupling end that includes a tapered region. As generally referred to herein, the term substantially reflective refers to a surface capable of reflecting at least 80 percent of incident light. The tapered region may be formed by cutting away and polishing a portion of the AWG chip such that an angled surface is formed, although other approaches to providing the tapered region will be apparent. The core material may have an index of refraction different from that of the medium adjacent to the AWG chip, such as air. Thus, and in accordance with Snell's law, light traveling via the longitudinal path provided by the output waveguides can encounter the angled surface and substantially reflect along a second light path, with the second light path being generally orthogonal to the first light path. The particular amount of light reflected by the angled surface can be about 80% or more. Light along the second light path can encounter a sidewall of the AWG chip and be emitted therefrom towards detector devices. The surface of the sidewall region that emits the light away from the AWG device may be accurately described as an output interface or a direct coupling interface.

Detector devices such as a photodiode may be disposed in a manner that aligns light-sensitive regions of the same with the direct coupling interface of the AWG device. A detector device may be provided for each channel output such that each channel wavelength is received and detected by an associated detector. Each detector device may be configured to detect channel wavelengths and provide the same to associated circuitry for amplification and conversion to electrical signaling. The detector devices may be disposed a distance D from the direct coupling interface of the AWG device in order to reduce the potential of damage to the detector devices and/or the AWG device when, for example, shifting/moving the ROSA components during active alignment procedures. Active alignment procedures can be conducted during manufacturing by providing a test WDM signal into the AWG device and monitoring the optical power of the signals received by the detectors, moving components (e.g., the AWG device and/or the detectors) and retesting. Thus the potential for damage may be reduced by providing a small gap between the AWG device and detector devices. In some cases, a material such as a gel may be inserted between the AWG device and detector devices. The index of refraction for the material may be about 1.0 or other suitable index that allows light to pass into the detector devices. In other cases, the detector devices may be disposed directly on the surface of the AWG chip forming the direct coupling interface.

Thus, numerous advantages to the direct-coupling AWG device will be apparent in light of this disclosure. For example, the insertion losses associated with coupling a fiber array to an output end of the AWG device can be eliminated. Consequently, the insertion loss associated with coupling the fiber array to associated detectors devices may also be eliminated. Thus, overall insertion loss may be reduced by at least 1 db to 2 db. To this end, the overall performance of the ROSA improves as the sensitivity of the ROSA is increased by the same amount, e.g., 1 db to 2 db. In addition, the overall length of the AWG device can be reduced as the direct coupling interface of the AWG allows detector devices to be positioned beside the AWG device versus a fiber array such as a pigtail that extends from an end of the AWG device. This reduction in length is particularly important when designing AWG devices for highly-constrained housings, e.g., small form-factor configurations.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid or course wavelength division multiplexing (CWDM).

The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly coupled" or "directly optically coupled" as used herein refers any optical connection that allows light to be imparted from one element to another without the use of an intermediate device such as a fiber.

Example Optical Transceiver System

Figure 3:
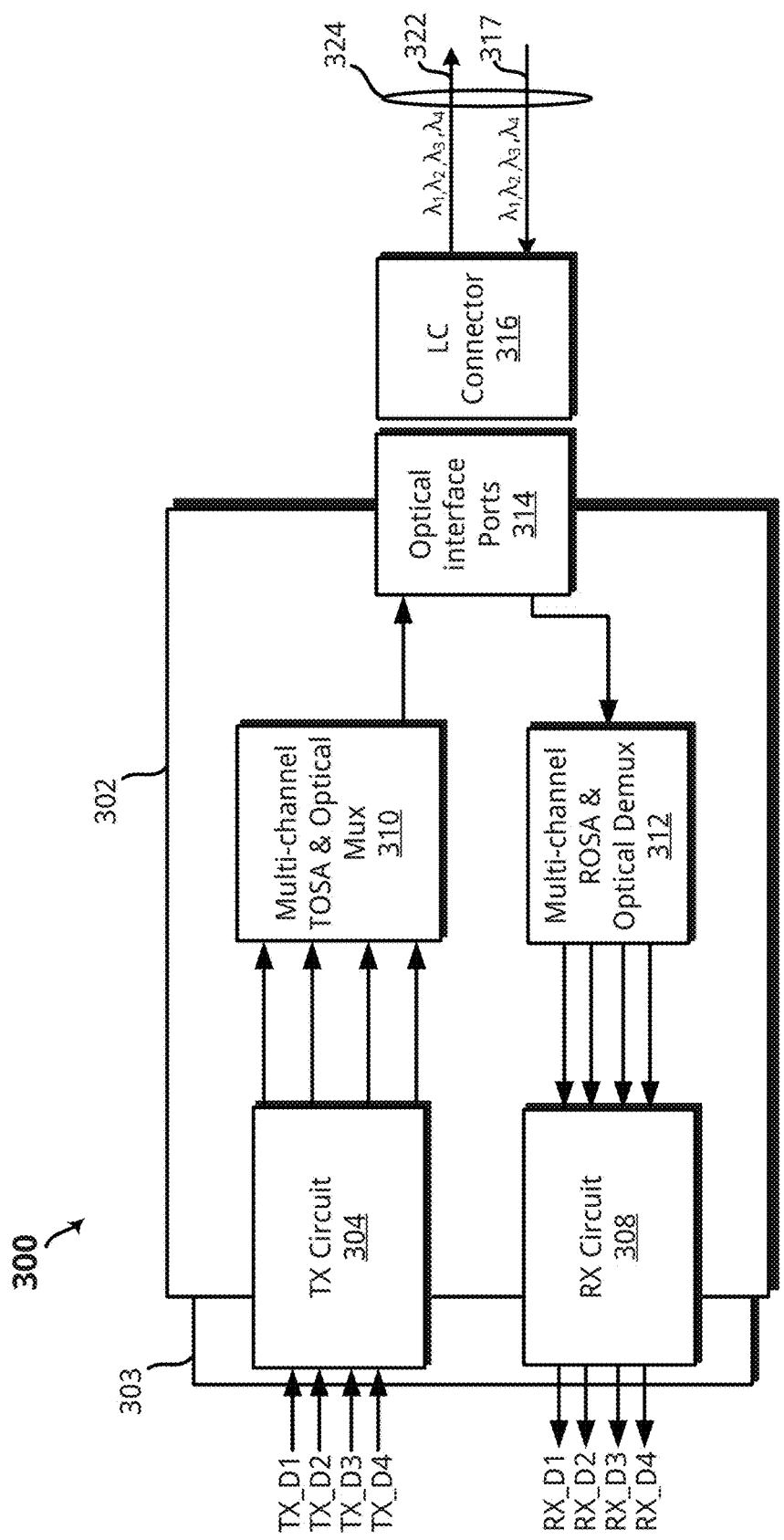
FIG. 3 schematically illustrates an embodiment of an optical transceiver module including a multi-channel transmitter optical sub-assembly (TOSA) and multi-channel receiver optical sub-assembly (ROSA).

Now turning to FIG. 3, there is an optical transceiver 300 consistent with embodiments of the present disclosure. In more detail, the optical transceiver 300 transmits and receives four (4) channels using four different channel wavelengths ($\lambda_1$, $\lambda_2$, $\lambda_3$, $\lambda_4$) and may be capable of transmission rates of at least about 25 gigabits (Gbs) per channel or more. In one example, the channel wavelengths $\lambda_1$, $\lambda_2$, $\lambda_3$, $\lambda_4$ may be 1270 nm, 1290 nm, 1310 nm, and 1330 nm, respectively. The optical transceiver 300 may also be capable of both short transmission distances of tens of meters, for example, to distances of 2 kilometers or more. The optical transceiver 300 may be used, for example, in internet data center applications or fiber to the home (FTTH) applications. In an embodiment, the optical transceiver 300 implements a Quad Small Form-Factor Plugging (QSFP) transceiver. For example, the optical transceiver 300 may be implemented within a QSFP receiver that comports with the "SFF Committee Specification SFF-8665 for QSFP+28 Gb/s 4× Pluggable Transceiver Solution (QSFP28)" published on May 10, 2013. The aspects and embodiments disclosed herein may be used within other transceiver types and is not necessarily limited to QSFP or QFSP+ transceivers. The optical transceiver 300 may be configured for dense wavelength division multiplexing (DWDM) or course wavelength division multiplexing (CWDM), depending on a desired configuration. Although aspects and scenarios disclosed herein discuss a four (4) channel configuration, other channel configurations, e.g., 2, 4, 16, 32, and so on, are within the scope of this disclosure.

As shown, the optical transceiver 300 includes a housing 302 that includes a multi-channel TOSA arrangement 310 for transmitting optical signals on different channel wavelengths, and a multi-channel ROSA 312 for receiving optical signals on different channel wavelengths. A transmit connecting circuit 304 and a receive connecting circuit 308 provide electrical connections to the multi-channel TOSA 310 and the multi-channel ROSA 312, respectively, within the transceiver housing 302. The transmit connecting circuit 304 and the receive connecting circuit 308 may communicate with external systems via data bus 303. In some cases, data bus 303 is a 38-pin connector that comports with physical connector QSFP standards and data communication protocols.

In any event, the transmit connecting circuit 304 electrically couples to the electronic components in the multi-channel TOSA arrangement 310, e.g., laser assemblies, and the receive connecting circuit 308 electrically couples to the electronic components in the multi-channel ROSA 312, e.g., an array waveguide grating (AWG), detectors, amplification circuitry and so on. The transmit connecting circuit 304 and the receive connecting circuit 308 include at least conductive paths to provide electrical connections, and may also include additional circuitry. The multi-channel TOSA 310 transmits and multiplexes multiple different channel wavelengths, and is coupled to an optical interface port 314. The optical interface port 314 may include an LC connector port, although other connector types are also within the scope of this disclosure.

In cases where the optical interface port 314 comprises a duplex, or bi-directional, LC receptacle, the LC connector receptacle provides optical connections to the multi-channel TOSA 310, and provides optical connections to the multi-channel ROSA 312. The LC connector receptacle may be configured to receive and be coupled to a mating LC connector 316 such that transmit optical fiber 322 of the external fibers 324 optically couples to the multi-channel TOSA 310 arrangement, and the receive optical fiber 317 of the external fibers 324 optically couples to the multi-channel ROSA 312.

The multi-channel TOSA arrangement 310 can include multiple laser packages 311-1 to 311-N (FIG. 4) and optics for producing associated channel wavelengths, and can couple the same into the transmit optical fiber 322. In particular, the lasers 311-1 to 311-N in the multi-channel TOSA arrangement 310 can convert electrical data signals (TX_D1 to TX_D4) received via the transmit connecting circuit 304 into modulated optical signals transmitted over transmit optical fiber 322. The lasers may include, for example, distributed feedback (DFB) lasers with diffraction gratings. In other cases, the lasers may comprise electro-absorption modulated laser (EML) laser diode packages. The multi-channel TOSA 310 may also include monitor photodiodes for monitoring the light emitted by the lasers. The multi-channel TOSA 310 may further include one or more temperature control devices, such as a resistive heater and/or a thermoelectric cooler (TEC), for controlling a temperature of the lasers, for example, to control or stabilize the laser wavelengths.

The multi-channel ROSA 312 can include demultiplexing optics such as an AWG device 402, as discussed further below, and a plurality of detectors such as photodiode packages configured to receive de-multiplexed channel wavelengths. The ROSA 312 can use the detectors and associated circuitry (e.g., a TIA) to detect, amplify and convert de-multiplexed channel wavelengths and can provide the same as electrical data signals, e.g., RX_D1 to RX_D4.

Figure 4:
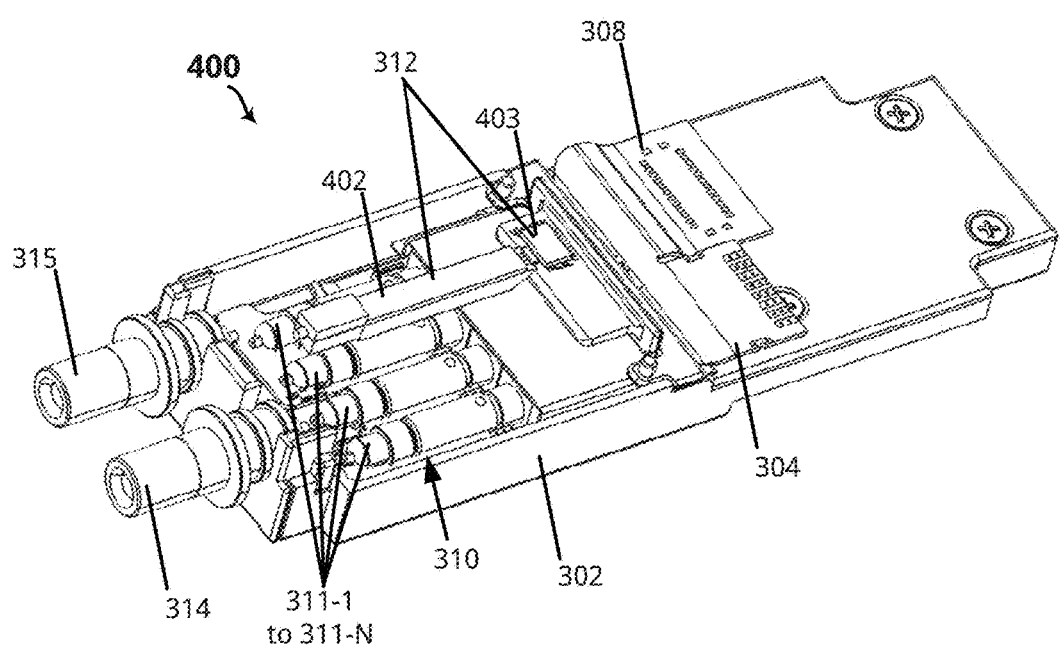
FIG. 4 is a perspective view of an example small form-factor (SFF) pluggable transceiver with a multi-channel TOSA configuration and a multi-channel ROSA having a direct-coupling arrayed waveguide grating (AWG) device, in accordance with an embodiment of the present disclosure.

Referring to FIG. 4, an example small form-factor (SFF) pluggable optical transceiver 400 with a multi-channel TOSA arrangement and multi-channel ROSA is shown in greater detail. The embodiment shown in FIG. 4 is one example of the optical transceiver 300 of FIG. 3 implemented in a small-form factor. In some cases, the optical transceiver 400 may implement the QSFP+ specification, or other applicable pluggable small-form factor specification. To this end, and in an embodiment, the optical transceiver 400 may be compliant with the QSFP28 MSA standard, and may include physical dimensions that conform to the SFF-8661 specification. In other cases, the optical transceiver 400 may implement the C form-factor pluggable (CFP) standard. In any such cases, the optical transceiver 400 may be configured to transmit and receive at a line rate of at least 100 Gb/s, respectively. This may be particularly advantageous when using the optical transceiver in, for example, a 100GBASE-LR4 application, per the IEEE 802.3ba standard. As shown, the optical transceiver 400 includes a transceiver housing 302, a multi-channel TOSA arrangement 310 including a plurality of laser assemblies to generate associated channel wavelengths and associated circuitry. The multi-channel TOSA arrangement 310 electrically couples to transmit flexible printed circuits (FPCs) 304 and couples to the optical interface port 314 at an end of the housing 302. The multi-channel ROSA arrangement 312 electrically couples to a receive FPC 308, and couples to the optical interface port 315 at an end of the housing 302. In an embodiment, the transceiver 400 can be configured to operate in a WDM passive optical network (PON), and to this end, the AWG 402 may be configured as a passive optical device. However, in some cases the AWG 402 can include active components and is not necessarily limited in this regard.

The multi-channel TOSA arrangement 310 can include a plurality of laser packages 311-1 to 311-N with each comprising, for example, an EML laser diode package. Each EML laser may include an integrated electro-absorption modulator (EAM) on a single chip, for example. Other laser types are also within the scope of this disclosure such as, for example, directly modulated laser (DML) diodes and TO can-type laser diodes. The particular laser type chosen may be based on a desired application. For instance, applications that require long-distance, e.g., about 10 km or greater, may favor EML lasers. Conversely, applications requiring shorter distances may use DMLs. In any event, and in accordance with an embodiment, each laser diode device of the multi-channel TOSA arrangement can be configured to transmit at about 25 Gb/s, or greater. Each laser package of the multi-channel TOSA arrangement 310 may provide a relatively narrow spectrum of channel wavelengths such as a single channel wavelength, or may be configured to provide a broad spectrum of channel wavelengths based on associated optics. In an embodiment, the lasers can provide center wavelengths 375 nm to 1650 nm, for example.

The multi-channel ROSA arrangement 312 can include a demux device, such as the direct-coupling arrayed waveguide grating (AWG) device 402. The direct-coupling AWG 402 may be configured to demultiplex a signal, e.g., a WDM signal, received via the optical interface port 315 into individual channel wavelengths. A fiber or other waveguide (not shown) can extend from the optical interface port 315 to an input of the AWG device 402. An output of the AWG 402 device can be coupled to, for example, an array of quad p-intrinsic-n (PIN) diodes and associated TIAs 403 for the purposes of detecting, amplifying and converting each of the channel wavelengths into an electrical signal. The AWG device 402 can be compatible with channel spacing configurations that comport with, for example, 25 nm IEEE LX-4 grids, 20-nm ITU G.694.2 CWDM grids, and a range of ITU G.694.1 DWDM grids in the range of 400 Ghz to 800 Ghz (e.g., 2 nm to 4 nm). The AWG device 402 may be directly coupled to detector devices, e.g., the array of photodetectors 801 (FIG. 8), as discussed in greater detail below.

Figure 5A:
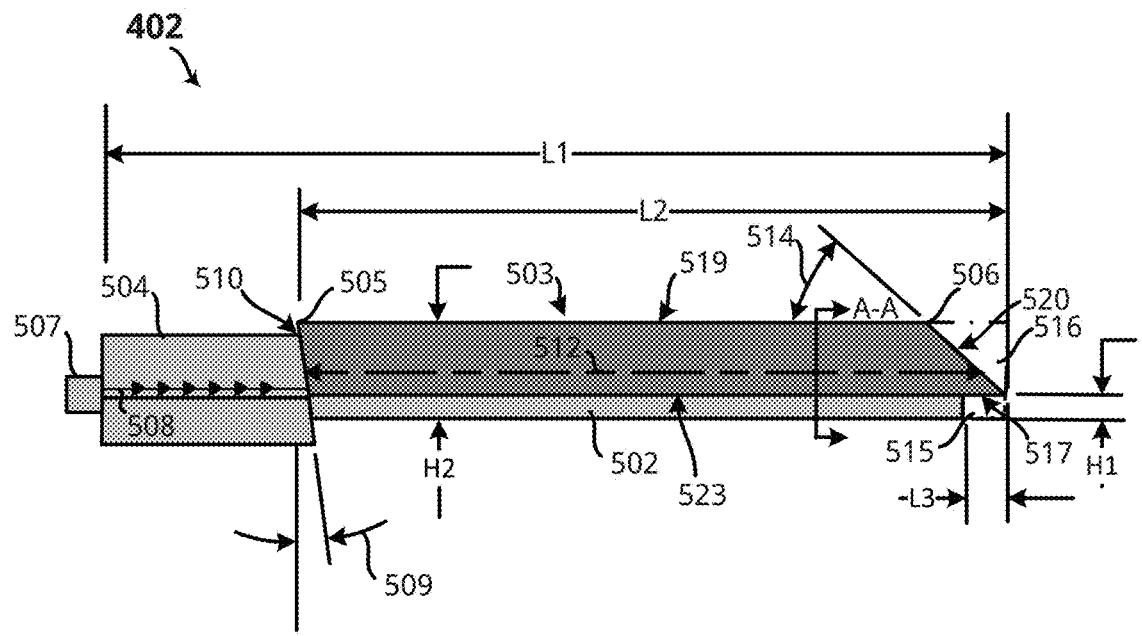
FIG. 5A shows a side plan view of the AWG device of FIG. 4, in accordance with an embodiment of the present disclosure.

Referring to FIG. 5A, one example of the direct-coupling AWG device 402 is shown in further detail, in accordance with an embodiment of the present disclosure. As shown, the AWG device 402 includes an AWG chip 503 having a first end 505 coupled to an input coupling region 504 and having a second end 506, with the second end 506 being proximal to a direct coupling interface 517 or region. The input coupling region 504 can include an optical coupling port 507, with the optical coupling port 507 being configured to receive and optically couple to a fiber of the optical coupling receptacle 215. In general, AWG devices can support both multiplexing and de-multiplexing of optical signals, and thus, the first end 505 is not necessarily an "input" in all applications. However, for the purposes of the aspects and scenarios disclosed herein, the first end 505 is configured to receive an optical signal via fiber 508 and generally launch the same along a longitudinal path indicated by arrows appearing along fiber 508 to launch a WDM optical signal into the AWG chip 503. In some cases, the optical coupling port 507 is an LC receptacle. The input coupling region 504 may not necessarily contain a length of fiber and instead comprise, for instance, a cavity or other waveguide structure. Moreover, the length of fiber 508 depicted in FIG. 5A can be provided by an optical cable mated with optical coupling port 507 and is not necessarily a separate length of fiber.

The input coupling region 504 may be coupled to the AWG chip 503 using, for example, an adhesive, although other methods of fixation should be apparent in light of this disclosure. The input coupling region 504 can include an end with a mounting surface 510 having an angle 509, with angle 509 being about 8 degrees. The angle 509 can reduce back reflection when launching light into the AWG chip 503. To this end, the first end 505 of the AWG chip may also include a mounting surface with an angle of about 8 degrees, thus allowing for proper alignment between a core of the fiber 508 and an input of the AWG chip 503.

The AWG chip 503 can comprise, for example, a planar lightwave circuit (PLC) such as a silica-based planar lightwave PLC device. PLC devices can be fabricated using a wafer process similar to those used for integration of silicon microchips and ICs. Processes for AWG chips can include, for example, forming a circuit pattern using photolithography, etching and deposition and/or epitaxial growth on a substrate, e.g., a silicon or silicon-based substrate. The formed AWG chip 503 can include a cladding material of, for example, silica ($SiO_2$), and a core material of doped silica, or other suitable composition that can provide a contrasting index of refraction for light confinement purposes. The contours of the AWG chip 503 may be defined by the shaping/etching of the silica during formation processes, or by post-processes such as cutting and polishing. Thus the AWG chip 503 can comprise a plurality of sidewalls that are formed from a cladding material layer. However, the AWG chip 503 can include additional protective layers/coatings, such as a metal housing, and is not necessarily limited to the embodiment shown.

Figure 5B:
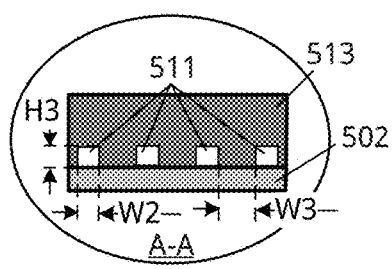
FIG. 5B shows a cross-sectional view of the AWG device of FIG. 5A taken along the line A-A, in accordance with an embodiment of the present disclosure.

Turning to FIG. 5B, an enlarged cross-section taken along the line A-A of FIG. 5A shows additional aspects of the AWG chip 503 in greater detail. As shown, the AWG chip 503 can include a plurality of optical paths 511 or output waveguides formed via deposited/grown core layers, with the output waveguides 511 extending longitudinally along the AWG chip 503. The output waveguides 511 may be formed using, for example, sequentially deposited/grown layers of doped silica or suitable core material. The output waveguides 511 form at least a portion of the waveguide circuit of the AWG chip 503 and operate similar to that of conductive leads/traces on a printed circuit board. Each of the output waveguides 511 may have a width W2 of about 6 microns and a height H3 of about 3 microns, although other core configurations are also within the scope of this disclosure. Channel spacing, e.g., width W3, between each waveguide is discussed below with regard to FIG. 7. Likewise, the cladding layer 513 can be formed from sequentially deposited/grown layers of silica or other suitable cladding material.

In an embodiment, the output waveguides 511 of the AWG chip 503 can enable confinement of light within the waveguides defined by the circuit patterned on the AWG chip 503. This functionality is based at least in part on the relative index of refraction between the compositions of the core versus the cladding. For example, a silica-based cladding material can include an index of refraction $N_1$ of about 1.45. In contrast, the output waveguides 511 can be formed from a core material having an index of refraction $N_2$, with index of refraction $N_2$ being within about 0.7% of $N_1$. The particular material composition of the core and cladding may be selected to reduce insertion loss with the fiber 508, which is also known as index-matching. In any event, aspects and embodiments disclosed herein are not necessarily limited to silicon or silicon-based compositions and are equally applicable to other materials used to form an AWG device.

Turning back to FIG. 5A, the AWG chip 503 can include an output interface 517 (also called a direct coupling interface), which is discussed in greater detail below. As shown, the second end 506 of the AWG chip 503 includes an angled surface 520 that extends from a first sidewall 519 to a second sidewall 523, with the angled surface 520 defining a tapered region of the AWG chip 503. The angled surface 520 can include an angle 514 relative to longitudinal axis 521, with angle 514 being selected to cause incident light to reflect downwardly at about a 90-degree angle towards the region indicated at 515, which is shown and discussed in further detail with reference to FIG. 8. Depending on the particular materials used to form the AWG chip 503, and more particularly, their respective index of refraction, the angle 514 can vary. Likewise, the angle 514 may vary within nominal manufacturing tolerances of, for instance, ±2%. In an embodiment, the angle 514 is a range between about 40 degrees to 45 degrees. In some cases, the angled surface 520 is provided by cutting, buffing, etching, or otherwise removing a portion of the AWG chip 503. This removed region is generally indicated at 516 for purposes of illustration. The surface of the second end 506 may be polished to ensure surface-level defects caused by the removal process are removed or otherwise reduced such that a substantial portion, e.g., at least 80%, of light is reflected downwards towards the region indicated at 515. Formation of the AWG chip 503 can include removing a portion of the substrate generally indicated at 515 to expose the output interface region 517. The exposed output interface region 517 may be polished to ensure a suitable optical coupling.

In an embodiment, the AWG device 402 can include an overall length L1 of about 13 mm. The overall length L1 can be less than a similarly configured AWG chip that uses a fiber array coupling scheme, such as the one discussed above with regard to FIGS. 1 and 2. The AWG chip 503 can include a length L2 of about 10 mm, and a height H2 of about 1.30 mm including the substrate 502, and about 1 mm without. To this end, the substrate can include a height H1 of about 0.3 mm. The region generally indicated at 515, and more particularly the output interface region 517, can include a length L3 of about 0.60 mm.

Figure 6:
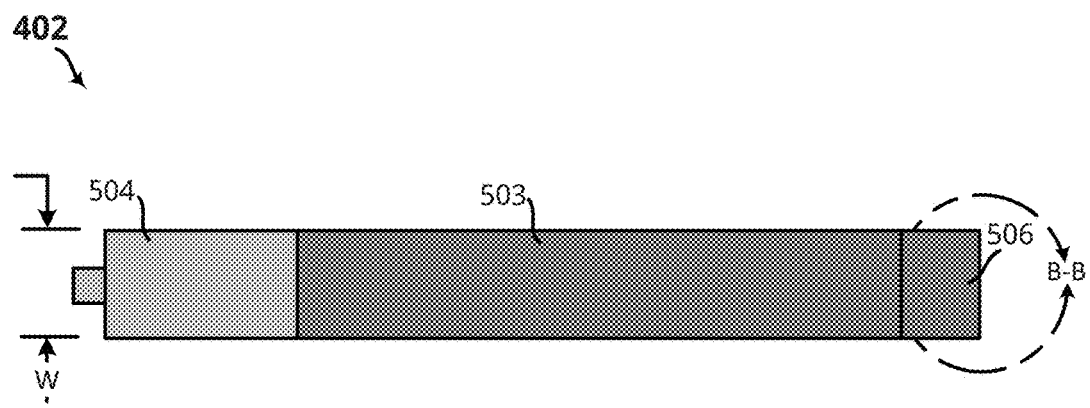
FIG. 6 shows an top plan view of the AWG device of FIG. 4, in accordance with an embodiment of the present disclosure.
Figure 7:
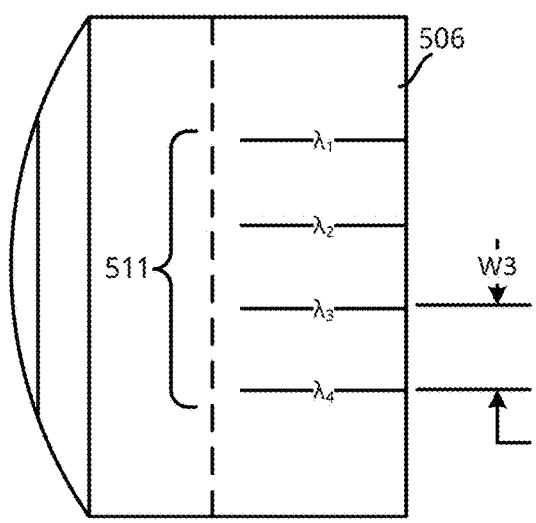
FIG. 7 shows an enlarged detail view of the AWG device of FIG. 6 taken along the line B-B, in accordance with an embodiment of the present disclosure.

Turning to FIG. 6, a top plan view of the AWG 402 is shown, in accordance with an embodiment. As shown, the AWG 402 can include a width W of about 1.5 mm. Other configurations are within the scope of this disclosure and the specific examples provided herein should not be construed as limiting. FIG. 7 shows a detail view of a portion of the AWG 402 taken along the line B-B, in accordance with an embodiment of the present disclosure. As shown, the output waveguides 511 include a channel spacing W3 of about 0.25 mm, although other channel spacing arrangements will be apparent in light of this disclosure.

Figure 8:
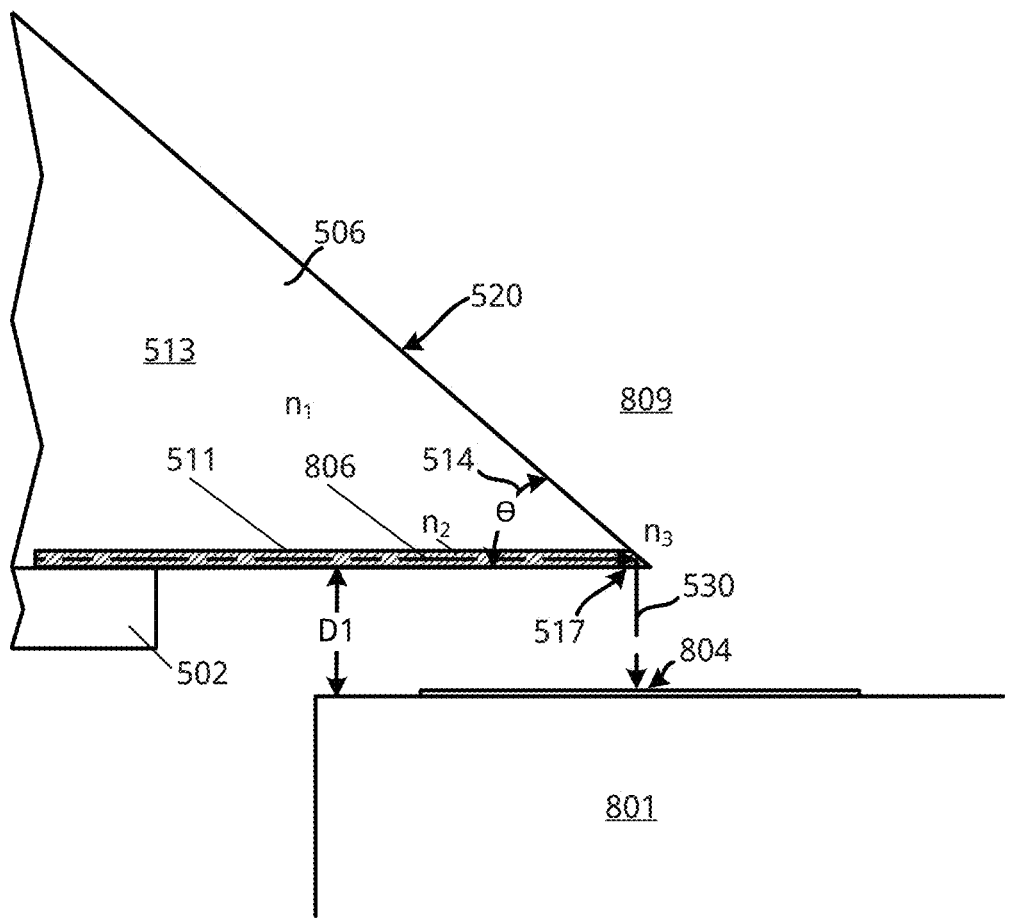
FIG. 8 shows an enlarged view of a direct coupling end of the AWG device of FIG. 4, in accordance with an embodiment of the present disclosure.

Turning to FIG. 8, an enlarged perspective view of the second end 506 of the AWG chip 503 is shown, in accordance with an embodiment of the present disclosure. The embodiment of FIG. 8 is illustrated in a highly simplified and exaggerated manner for the purposes of clarity and practicality. As shown, the output waveguides 511 can each provide a first light path generally indicated at 806, with the first light path 806 extending longitudinally towards the direct coupling end 506. A detector array 801 such as a photodiode (PD) array or bar can be positioned at a distance D1 from the direct coupling interface 517, with D1 being about 50 microns. As previously discussed, the second end 506 can include the surface 520 which has an angle 514 of about 40 degrees to 45 degrees relative to the light path 806, depending on the composition of the AWG chip. For example, the angle 514 may be about 41 degrees in instances where the output waveguides 511 and the cladding layer 513 are silicon-based or otherwise have an index of refraction of about 1.45 to 1.5. Each of the output waveguides 511 form at least a portion of the angled surface 520, and thus also include a tapered region having the angle 514. Note that the tapered regions of the output waveguides 511 may be introduced when, for instance, a portion of the AWG chip 503 is cut or otherwise removed.

In any event, the angle 514 can provide an angle of incidence that can allow a substantial amount of light, e.g., at least 80 percent, to reflect towards the detectors 801. For example, as shown, light incident to the angled surface 520 or tapered region can reflect downwards along a second light path 530 and pass through the direct coupling interface 517, with the second light path 530 being generally orthogonal to the first light path 806. As previously discussed, the difference in the index of refraction between the cladding layer 513 (denoted as $n_1$) and the output waveguides 511 allow light signals to be substantially confined within the output waveguides 511. Furthermore, the external regions 809 adjacent to the AWG 402, and more particularly the angled surface 520, can include an index of refraction of $n_3$, with the index of refraction $N_3$ being less than that of $n_1$ and $n_2$. For example, the external regions 809 may comprise air which has an index of refraction of about 1.00. Thus the separated channel wavelengths that launch along associated ones of the output waveguides 511 along light path 806 can be reflected towards the detectors 804 as a result of the contrast between index of refraction n2 and n3. The resulting angle of reflection may be calculated based on Snell's Law:

$$n1 \sin \theta_1 = n2 \sin \theta_2 \quad \text{Equation (1)}$$

Where n1 is the refractive index of a first medium, n2 is a refractive index of a second medium, $\sin \theta_1$ is the angle of incidence and $\sin \theta_2$ is the angle of reflection, thus:

$$\sin \theta_2 = \frac{n1 \sin \theta_1}{n2} \quad \text{Equation (2)}$$

Figure 9:
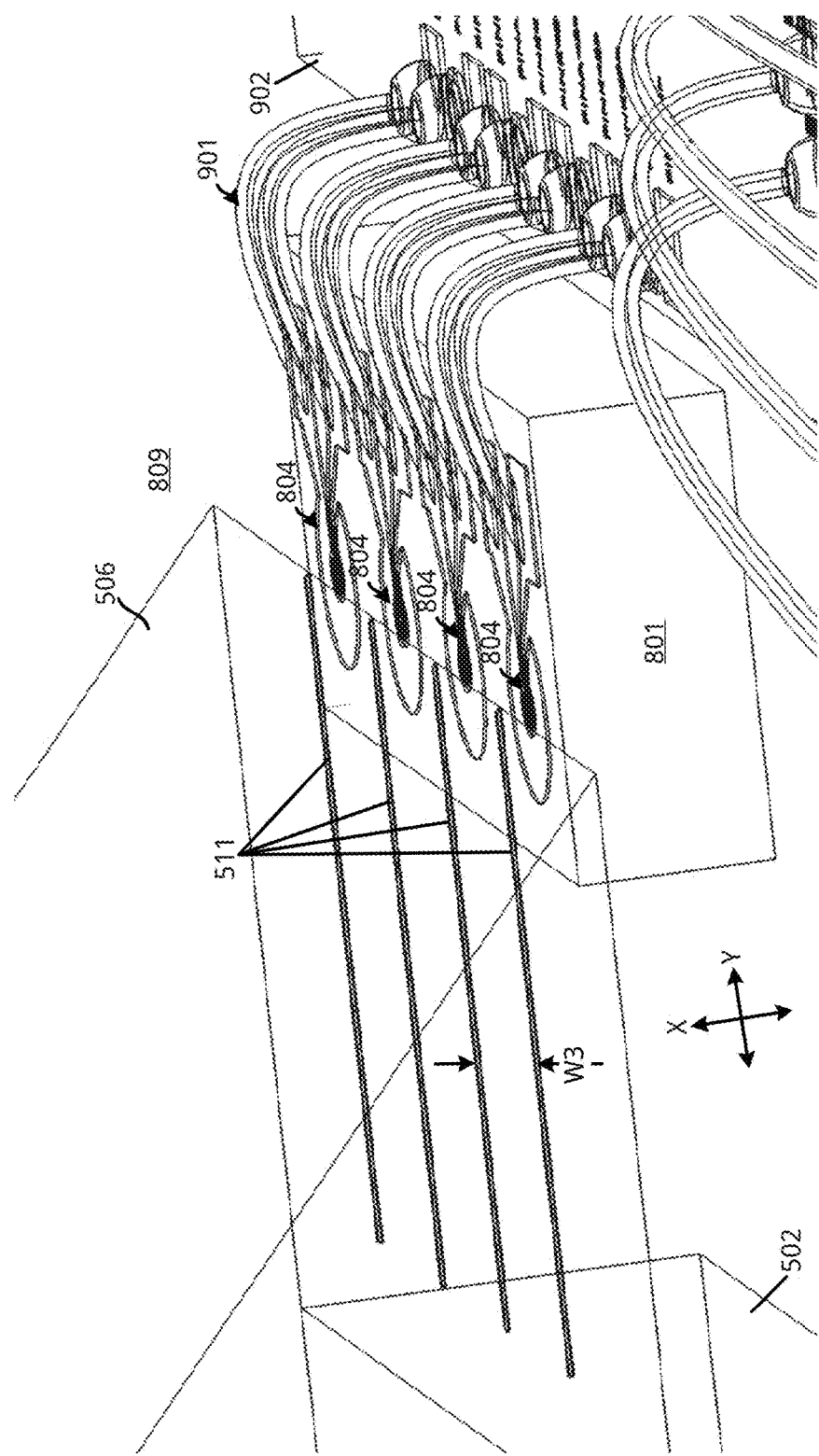
FIG. 9 shows a perspective view of the direct coupling end of the AWG device of FIG. 4, in accordance with an embodiment of the present disclosure.

In use, each of the output waveguides 511 can provide associated channel wavelengths along a first light path generally indicated at 806. The light along light path 806 may then encounter the angled surface 520 and reflect therefrom along the second light path 530, with the second light path 530 being generally orthogonal to the first light path 806. Then, light traveling along the second light path 530 can encounter the photo-sensitive regions of the detectors 804. FIG. 9 shows the orientation of the detectors 804 relative to each of the waveguides 511 in greater detail.

Turning to FIG. 9, and with additional reference to FIG. 8, another perspective view shows the second end 506 of the AWG chip 503 adjacent to the array of detectors 801, in accordance with an embodiment of the present disclosure. The second end 506 is illustrated in a fully-transparent and simplified manner for practicality and clarity. As shown, each of the output waveguides 511 extends longitudinally to the second end 506 such that each of the output waveguides 511 provides a first respective light path, e.g., the first light path 806. As previously discussed with reference to FIG. 7, the output waveguides 511 can be spaced at a nominal distance W3, with the nominal distance W3 being about 0.25 mm or a different distance depending on a desired channel spacing configuration. As further shown, each of the detector devices 804 are aligned beneath the output interface region 517, and more particularly, beneath respective ones of the output waveguides 511. Thus the AWG 402 may be understood to directly couple to the detectors 804, without the necessity of an additional waveguide or fiber device there between. The detectors 804 may be electrically coupled to associated circuitry of the receive connecting circuit 108 such as a TIA via, for example, wire bonding 901 or other suitable electrical interconnection.

Further Example Embodiments

In one aspect an arrayed waveguide grating (AWG) chip is disclosed. The AWG chip comprising a first end for coupling to an optical coupling receptacle to receive an optical signal comprising a plurality of channel wavelengths, a planar lightwave circuit (PLC) coupled to the first end configured to de-multiplex each channel wavelength of the plurality of channel wavelengths, a plurality of output waveguides coupled to the PLC, each of the output waveguides configured to receive light corresponding to an associated de-multiplexed channel wavelength launched from the PLC and provide the light along a light path that extends towards a second end of the AWG chip, and a tapered region disposed at the second end of the AWG chip configured to receive light via the plurality of output waveguides and reflect the same towards an output interface region of the AWG chip.

In another aspect, an optical transceiver module is disclosed. The optical transceiver module comprising a transceiver housing, a multi-channel receiver optical sub-assembly (ROSA) located in the transceiver housing and including an arrayed waveguide grating (AWG) chip, the AWG chip comprising a first end for coupling to an optical coupling receptacle to receive an optical signal comprising a plurality of channel wavelengths, a planar lightwave circuit (PLC) coupled to the first end configured to de-multiplex each channel wavelength of the plurality of channel wavelengths, a plurality of output waveguides coupled to the PLC, each of the output waveguides configured to receive light corresponding to an associated de-multiplexed channel wavelength launched from the PLC and provide the light along a light path that extends towards a second end of the AWG chip, and a tapered region disposed at the second end of the AWG chip configured to receive light via the plurality of output waveguides and reflect the same towards an output interface region of the AWG chip, an array of detector devices disposed adjacent to the output interface region of the AWG chip, and a multi-channel transmitter optical assembly (TOSA) including at least one laser package located in the transceiver housing for transmitting optical signals at different channel wavelengths.

In yet another aspect, a method of forming an arrayed waveguide grating (AWG) is disclosed. The method comprising depositing sequential layers of cladding and core material onto a substrate to form a planar lightwave circuit (PLC), removing a portion of the substrate to expose an output interface region of the PLC, and removing a portion of the PLC to provide a tapered region proximal to the output interface region of the PLC.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An arrayed waveguide grating (AWG) chip comprising:
a first end for coupling to an optical coupling receptacle to receive an optical signal comprising a plurality of channel wavelengths;
a substrate;
a planar lightwave circuit (PLC) disposed on the substrate, the PLC coupled to the first end and configured to de-multiplex each channel wavelength of the plurality of channel wavelengths;
a plurality of output waveguides coupled to the PLC, each of the output waveguides configured to receive light corresponding to an associated de-multiplexed channel wavelength launched from the PLC and provide the light along a first light path that extends towards a second end of the AWG chip; and
a tapered region disposed at the second end of the AWG chip configured to receive light via the plurality of output waveguides and reflect the same towards an exposed output interface region of the AWG chip, wherein the exposed output interface region emits the received light from the AWG chip on the same side as the substrate without passing the received light through the substrate.

2. The AWG chip of claim 1, wherein the exposed output interface region is configured to pass the reflected light received via the plurality of output waveguides out of the AWG chip along a second light path that is substantially orthogonal to the first light path.

3. The AWG chip of claim 1, wherein the AWG chip defines a plurality of sidewalls extending longitudinally from the first end to the second end, and wherein the tapered region of the second end defines an angled surface that extends from a first sidewall of the plurality of sidewalls to a second sidewall of the plurality of sidewalls.

4. The AWG chip of claim 3, wherein the angled surface has an interior angle of about 41 to 45 degrees relative to the exposed output interface region.

5. The AWG chip of claim 3, wherein each of the output waveguides comprise a core material, and wherein a cladding material is disposed on the core material, the core material defining at least a portion of the plurality of sidewalls of the AWG chip.

6. The AWG chip of claim 5, wherein the core material of each of the plurality of output waveguides has a first index of refraction, and a medium external to and adjacent the tapered region has a second index of refraction, the first index of refraction being greater than the second index of refraction.

7. The AWG chip of claim 6, wherein the external medium comprises a material having an index of refraction of about 1.0.

8. The AWG chip of claim 5, wherein the core material of each of the plurality of output waveguides provide a portion of the angled surface, and wherein the angled surface is configured to reflect incident light based on at least an interior angle of the angled surface.

9. The AWG chip of claim 5, wherein the core material comprises doped silica ($SiO_2$) having an index of refraction of about 1.45 to 1.50.

10. The AWG chip of claim 1, wherein the AWG chip is configured as a 1×N demultiplexer device whereby a single optical input signal is de-multiplexed into N different channel wavelengths.

11. The AWG chip of claim 1, wherein the AWG chip is implemented in an AWG device package.

12. An optical transceiver module comprising:
a transceiver housing;
a multi-channel receiver optical sub-assembly (ROSA) located in the transceiver housing and including an arrayed waveguide grating (AWG) chip, the AWG chip comprising:
 a first end for coupling to an optical coupling receptacle to receive an optical signal comprising a plurality of channel wavelengths, wherein the first end for coupling to the optical coupling receptacle includes an angled surface to reduce back reflections of an optical signal launched into the AWG chip;
 a planar lightwave circuit (PLC) coupled to the first end configured to de-multiplex each channel wavelength of the plurality of channel wavelengths;
 a plurality of output waveguides coupled to the PLC, each of the output waveguides configured to receive light corresponding to an associated de-multiplexed channel wavelength launched from the PLC and provide the light along a first light path that extends towards a second end of the AWG chip; and
 a tapered region disposed at the second end of the AWG chip configured to receive light via the plurality of output waveguides and reflect the same towards an output interface region of the AWG chip;
an array of detector devices disposed adjacent to the output interface region of the AWG chip; and
a multi-channel transmitter optical assembly (TOSA) including at least one laser package located in the transceiver housing for transmitting optical signals at different channel wavelengths.

13. The optical transceiver module of claim 12, wherein the output interface region of the AWG chip is an exposed region adjacent an air gap, and wherein the air gap separates the output interface region of the AWG chip and the array of detector devices.

14. The optical transceiver module of claim 12, wherein the output interface region of the AWG chip is separated from the array of detector devices by about 50 microns.

15. The optical transceiver module of claim 12, wherein the AWG chip defines a plurality of sidewalls extending longitudinally from the first end to the second end, and wherein the tapered region of the second end defines an angled surface that extends from a first sidewall of the plurality of sidewalls to a second sidewall of the plurality of sidewalls.

16. The optical transceiver module of claim 15, wherein the angled surface has an interior angle of about 41 to 45 degrees relative to the output interface region.

17. The optical transceiver module of claim 15, wherein each of the output waveguides comprise a core material, and wherein a cladding material is disposed on the core material, the core material defining at least a portion of the plurality of sidewalls of the AWG chip.

18. The optical transceiver module of claim 17, wherein the core material of each of the plurality of output waveguides provide a portion of the angled surface, and wherein the angled surface is configured to reflect incident light based on at least an interior angle of the angled surface relative to the output interface of the AWG chip.

19. The optical transceiver of claim 12, wherein the transceiver is a Small Form-factor Pluggable (SFP) transceiver module and the ROSA is configured to receive at least four different channel wavelengths at transmission rates of at least about 25 Gbps per channel.

* * * * *